United States Patent
Agost et al.

(10) Patent No.: US 10,943,184 B2
(45) Date of Patent: Mar. 9, 2021

(54) MACHINE LEARNING METHODS AND SYSTEMS FOR PREDICTING ONLINE USER INTERACTIONS

(71) Applicant: Amadeus S.A.S., Biot (FR)

(72) Inventors: Rodrigo Acuna Agost, Golfe Juan (FR); Alejandro Ricardo Mottini D'Oliveira, Nice (FR); David Renaudie, Valbonne (FR)

(73) Assignee: AMADEUS S.A.S., Biot (FR)

( * ) Notice: Subject to any disclaimer, the term of this patent is extended or adjusted under 35 U.S.C. 154(b) by 510 days.

(21) Appl. No.: 15/704,320

(22) Filed: Sep. 14, 2017

(65) Prior Publication Data

US 2019/0080260 A1     Mar. 14, 2019

(51) Int. Cl.
*G06Q 10/00*   (2012.01)
*G06Q 30/02*   (2012.01)
(Continued)

(52) U.S. Cl.
CPC ........... *G06N 20/00* (2019.01); *G06N 5/022* (2013.01); *G06Q 30/0242* (2013.01); *G06Q 30/0275* (2013.01)

(58) Field of Classification Search
USPC .................................................... 705/14.41
See application file for complete search history.

(56) References Cited

U.S. PATENT DOCUMENTS 7,594,189 B1 * 9/2009 Walker ............... G06F 16/9535
                                                                715/811
8,301,499 B2 * 10/2012 Moissinac .......... G06Q 30/0254
                                                                705/14.64
(Continued)

FOREIGN PATENT DOCUMENTS

CN       101484890 A     7/2009
EP       1223757 A2     7/2002
(Continued)

OTHER PUBLICATIONS

Langtangen HP author. A Primer on Scientific Programming with Python.; 2014. http://search.ebscohost.com/login.aspx?direct=true&db=edshlc&An=edshlc.014162883.9&site=eds-live&scope=site. Accessed May 22, 2020. (Year: 2014).*

(Continued)

*Primary Examiner* — Kambiz Abdi
*Assistant Examiner* — Dipen M Patel
(74) *Attorney, Agent, or Firm* — Thompson Hine LLP

(57) ABSTRACT

Methods and computing apparatus for retrieving records relating to content placement events and records relating to user interaction events. A set of enriched training feature vectors is computed from raw feature values, and used with interaction event tags to train a machine learning model. Information is received relating to an online content placement slot and information is received relating to a user to whom content within the online content placement slot will be displayed. An enriched estimation feature vector is computed based upon a content item selected for placement within the online content placement slot, the information relating to the user, and the information relating to the online content placement slot. A machine learning model is executed to determine an estimate of likelihood of the user interacting with the selected content item, based upon the enriched estimation feature vector.

8 Claims, 6 Drawing Sheets

(51) Int. Cl.
  *G06N 20/00* (2019.01)
  *G06N 5/02* (2006.01)

(56) References Cited

U.S. PATENT DOCUMENTS

| | | | |
|---|---|---|---|
| 8,442,863 B2* | 5/2013 | Chandramouli | G06Q 30/0241 705/14.43 |
| 8,494,897 B1 | 7/2013 | Dawson | |
| 8,626,579 B2 | 1/2014 | Fordyce, III et al. | |
| 8,626,697 B1 | 1/2014 | Chaine et al. | |
| 8,655,695 B1* | 2/2014 | Qu | G06Q 30/0251 705/14.49 |
| 10,467,655 B1* | 11/2019 | Feldman | H04L 67/02 |
| 10,565,622 B1* | 2/2020 | Burstein | G06Q 30/0266 |
| 2003/0229531 A1 | 12/2003 | Heckerman et al. | |
| 2005/0131762 A1 | 6/2005 | Bharat et al. | |
| 2008/0086558 A1* | 4/2008 | Bahadori | H04L 67/02 709/224 |
| 2009/0070443 A1 | 3/2009 | Vanderhook et al. | |
| 2010/0030647 A1 | 2/2010 | Shahshahani | |
| 2010/0070373 A1 | 3/2010 | Zoeter | |
| 2010/0198772 A1* | 8/2010 | Silverman | G06Q 30/02 706/52 |
| 2011/0040636 A1 | 2/2011 | Simmons et al. | |
| 2011/0054960 A1* | 3/2011 | Bhatia | G06Q 30/02 705/7.12 |
| 2011/0213655 A1* | 9/2011 | Henkin | G06Q 30/0251 705/14.49 |
| 2011/0231264 A1 | 9/2011 | Dilling et al. | |
| 2012/0023043 A1 | 1/2012 | Cetin et al. | |
| 2012/0036023 A1* | 2/2012 | Das | G06Q 30/02 705/14.71 |
| 2012/0041816 A1 | 2/2012 | Buchalter | |
| 2012/0323674 A1* | 12/2012 | Simmons | G06Q 30/0249 705/14.41 |
| 2013/0198188 A1 | 8/2013 | Huang et al. | |
| 2013/0254787 A1 | 9/2013 | Cox et al. | |
| 2013/0262226 A1 | 10/2013 | LaChapelle et al. | |
| 2014/0046777 A1 | 2/2014 | Markey et al. | |
| 2014/0143346 A1 | 5/2014 | Mahmud et al. | |
| 2015/0134463 A1 | 5/2015 | Jalali et al. | |
| 2015/0278970 A1 | 10/2015 | Valverde, Jr. et al. | |
| 2015/0324857 A1 | 11/2015 | Siegel et al. | |
| 2015/0339704 A1 | 11/2015 | Liu et al. | |
| 2016/0140587 A1 | 5/2016 | Wilson | |
| 2016/0180434 A1 | 6/2016 | Knight | |
| 2016/0292717 A1 | 10/2016 | Bhalgat et al. | |
| 2016/0371748 A1* | 12/2016 | Lidow | G06Q 30/0275 |
| 2017/0103451 A1 | 4/2017 | Alipov et al. | |
| 2018/0025045 A1 | 1/2018 | Kirti | |
| 2018/0253759 A1* | 9/2018 | Deng | G06Q 10/067 |
| 2018/0276578 A1 | 9/2018 | Otillar | |

FOREIGN PATENT DOCUMENTS

| | | |
|---|---|---|
| EP | 2874114 A1 | 5/2015 |
| JP | 2016062411 A | 4/2016 |
| WO | 2011020076 A2 | 2/2011 |

OTHER PUBLICATIONS

D. Li, G. Zhao, Z. Wang, W. Ma and Y. Liu, "A Method of Purchase Prediction Based on User Behavior Log," 2015 IEEE International Conference on Data Mining Workshop (ICDMW), pp. 1031-1039, https://ieeexplore.ieee.org/abstract/document/7395781/citations#citations, doi: 10.1109/ICDMW.2015.179. (Year: 2015).*

Olivier Chapelle, Eren Manavoglu, and Romer Rosales. 2015. Simple and Scalable Response Prediction for Display Advertising. ACM Trans. Intell. Syst. Technol. 5, 4, Article 61 (Jan. 2015), 34 pages. DOI:https://doi.org/10.1145/2532128 (Year: 2015).*

H. Brendan McMahan, Gary Holt et al. Ad click prediction: A view from the trenches. Proceedings of the 19th ACM international conference on Knowledge discovery and data mining (ACM SIGKDD 2013), pp. 1222-1230, https://www.eecs.tufts.edu/~dsculley/papers/ad-click-prediction.pdf (Year: 2013).*

Ta, A. (2015). Factorization machines with follow-the-regularized-leader for CTR prediction in display advertising doi:http://dx.doi.org/10.1109/BigData.2015.7364112 (Year: 2015).*

European Patent Office, International Search Report and Written Opinion issued in International Application No. PCT/EP2018/073845 dated Oct. 22, 2018.

European Patent Office, International Search Report and Written Opinion issued in International Application No. PCT/EP2018/073841 dated Oct. 22, 2018.

National Institute of Industrial Property, Preliminary Search Report issued in French Application No. 1758514 dated Mar. 15, 2018.

European Patent Office, International Search Report and Written Opinion issued in International Application No. PCT/EP2018/073838 dated Oct. 5, 2018.

National Institute of Industrial Property, Preliminary Search Report issued in French Application No. 1758517 dated Mar. 16, 2018.

McMahan et al., "Ad Click Prediction: a View from the Trenches", KDD'13, Aug. 11-14, 2013.

Chen et a., "XGBoost: A Scalable Tree Boosting System", KDD '16, Aug. 13-17, 2016.

Fotaki et al, "Exploring Big Data Opportunities for Online Customer Segmentation", International Journal of Business Intelligence Research (IJBIR) 5(3) Copyright: © 2014.

Breznitz et al., "A Strategic Advantage with Behavioral Targeting?", 35th DRUID Celebration Conference 2013, Barcelona, Spain, Jun. 17-19.

Rodrigo Acuno Agost et al., "Systems and Methods for Real-Time Online Traveler Segmentation Using Machine Learning", U.S. Appl. No. 15/704,428, filed Sep. 14, 2017.

Rodrigo Acuno Agost et al., "Methods and Systems for Intelligent Adaptive Bidding in an Automated Online Exchange Network", U.S. Appl. No. 15/704,647, filed Sep. 14, 2017.

National Institute of Industrial Property, Preliminary Search Report issued in French patent application No. 1758516 dated Mar. 15, 2018.

USPTO, Office Action dated Jun. 23, 2020 in U.S. Appl. No. 15/704,647.

USPTO, Office Action dated Jan. 31, 2020 in U.S. Appl. No. 15/704,647.

USPTO, Office Action dated Oct. 17, 2019 in U.S. Appl. No. 15/704,647.

USPTO, Office Action dated Sep. 25, 2020 in U.S. Appl. No. 15/704,428.

USPTO, Office Action dated May 21, 2020 in U.S. Appl. No. 15/704,428.

USPTO, Office Action dated Feb. 26, 2020 in U.S. Appl. No. 15/704,428.

USPTO, final Office Action issued in U.S. Appl. No. 15/704,428 dated Dec. 1, 2020.

USPTO, Office Action issued in U.S. Appl. No. 15/704,647 dated Dec. 15, 2020.

* cited by examiner

MACHINE LEARNING METHODS AND SYSTEMS FOR PREDICTING ONLINE USER INTERACTIONS

TECHNICAL FIELD

The present invention relates to the application of machine learning models for predicting behavior of online users.

BACKGROUND

Online (e.g., web-based, mobile, or in-app) advertising differs from advertising in traditional media in its degree of personalized audience targeting. For example, while broadcast media advertising, such as television advertising, aims to reach a target demographic defined by broad characteristics such as age-group, socioeconomic status, and/or general interests, online advertising aims to reach individuals having a particular interest in the product, service, or information that is presented.

Highly personalized audience targeting technology has led to the development of business models that are specific to online advertising. For example, it is now common for websites that provide news, aggregated information, and other content of interest to particular users, to host third-party advertisements as a means for generating revenue. Advertisers whose advertisements appear on these websites may pay the operator on the basis of viewing opportunities or impressions (commonly measured as 'cost per thousand impressions', a.k.a. CPM), on the basis of a cost per click (CPC), or according to some other measure of performance. The actual selection of an advertisement to be placed on a web page presented to an individual user may be based, at least in part, on a bidding process whereby an advertiser who is willing to pay a higher CPM, CPC, or other cost measure, is more likely to have its advertisement presented to the user.

According to one common model, the bidding process is facilitated by an 'ad exchange platform'. An ad exchange is a technology platform that implements a digital marketplace allowing advertisers and publishers of web sites and other online content to buy and sell advertising space, often through real-time auctions.

An ad exchange maintains a 'pool' of ad slots. Publishers contribute their ad slots, e.g., available advertising slots embedded within web pages served to users, into the pool. Buyers can then bid for the slots that they wish to purchase. Bidding decisions are often made in real time based on information such as the previous behavior of the user an ad is being served to, time of day, device type, ad position, and so forth. In practice, these bidding decisions must themselves be made very rapidly, e.g., in at most a few tens of milliseconds, using technology platforms commonly known as demand side platforms (DSPs). Since there is a real cost to the advertiser in purchasing impressions through an ad exchange, the performance of technologies and algorithms deployed in a DSP for assessing the potential 'value' of a user in order to make a bid decision may have a significant business impact.

By way of example, an average click through rate (CTR) for web-based display ads is around 0.05%, i.e., five clicks per 10,000 impressions. Where ad slots are purchased via an ad exchange, every impression represents a cost (i.e., the price paid following a winning bid). However, where a CPC model is employed, only 0.05% of impressions, on average, result in the generation of revenue. A low CTR thus results in an inefficient use of technical resources (such as the processing resources of the DSP) and a higher cost to successful advertisers (since a smaller number of 'clicks' must cover the cost of all impressions). Furthermore, a low CTR is indicative of a lack of suitability or relevance of the displayed advertising to online users.

It is, therefore, highly desirable to deploy technologies in DSP platforms that result in higher CTR. Such technologies benefit DSP operators by enhancing the utilisation of technical resources and increasing revenues generated from user interactions with advertising content. Advertisers also benefit from more effective and successful placement of ads, resulting in greater click-though, and delivery of a larger audience of potential interested customers. Online users also benefit, since higher CTR is generally achieved by placement of ads having greater suitability and relevance to users.

One common approach to increasing CTR employs online tracking to infer user interests and to place advertising content that is relevant to those interests. For example, browser cookies and other tracking technologies may be used to gather information regarding, for example, web sites visited by a user, topics viewed on social media sites, and/or online searches conducted by the user. Such information may be processed to identify advertising content that is inferred to be relevant to the user. However, predicting the likelihood that the user will interact with such content is more difficult. As noted above, average CTR is low, and individual online users therefore rarely interact with advertising content, even when it has been effectively targeted based on user interests. There is, accordingly, very little direct data that can be used to predict the likelihood of users interacting with advertising content on the basis of individual user tracking.

As a result, there is a clear need for real-time computer-implemented technologies, methods and systems that can be deployed within DSPs and that are able to make improved decisions regarding ad selection and bidding through ad exchange platforms. In particular, it would be desirable to provide improved methods and systems for predicting the likelihood that an online user will interact with advertising content. In order to meet technical requirements, and ensure that page load times are not unduly increased by the selection and bidding process, it is necessary that such a prediction be made in no more than a few tens of milliseconds.

SUMMARY

Embodiments of the invention may predict likelihood of user interaction with online content elements based upon aggregated behavior of prior users in similar contexts. The embodiments of the invention may be applied in online advertising systems, for example to determine whether or not to bid for placement of an advertisement to be presented to a user, e.g., via a web page on within a mobile app.

In embodiments of the invention, a method includes accessing an online data store to retrieve records relating to content placement events, and records relating to user interaction events, where the placement and interaction events occur within a defined time period. The method further includes matching retrieved content placement event records with retrieved interaction event records to generate a matched data set which comprises a plurality of records. Each record of the matched data set includes a set of raw feature values derived from a content placement event along with an interaction event tag indicating whether or not an interaction event occurred corresponding with the content placement event. The method further includes computing, from the raw feature values, a corresponding set of enriched training feature vectors, training a machine learning model using the enriched training feature vectors and corresponding interaction event tags, receiving, at a processor configured to execute the machine learning model, information relating to an online content placement slot and information relating to a user to whom content within the online content placement slot will be displayed, computing, by the processor, an enriched estimation feature vector based upon a content item selected for placement within the online content placement slot, the information relating to the user, and the information relating to the online content placement slot, and determining, by the processor executing the machine learning model, an estimate of likelihood of the user interacting with the selected content item, based upon the enriched estimation feature vector.

Advantageously, embodiments of the invention employ matching of aggregated content placement events with aggregated user interaction events to support prediction of online user interactions with content using a machine learning model. Content items may be, for example, online ads comprising one or more offers, and the user interaction events may comprise interactions such as clicks on specific offers within the ads. Accordingly, in such embodiments, the online content placement slot is an ad slot, the information relating to the ad slot and information relating to the user to whom content within the ad slot will be displayed is received along with a bid request message transmitted from an ad exchange server, and the content item comprises at least one offer for placement within the ad slot.

The method may further include transmitting, to the ad exchange server by the processor, a bid response message in reply to the bid request message, receiving, by the processor from the ad exchange server, a successful bid notification, updating, by the processor, the online data store with content placement event data relating to placement of the content item, receiving, by the processor, a notification of a user interaction with the content item, and updating the online data store with user interaction event data relating to the user interaction with the content item.

In this way, embodiments of the invention provide for continuous updating of the stored records of content placement events and user interaction events, enabling the machine learning model to be updated with current information regarding user behavior. To this end, the method may comprise repeatedly executing the actions of accessing the online data store, matching the retrieved content placement event records with the retrieved interaction event records, computing enriched training feature vectors, and training the machine learning model.

In embodiments of the invention, a computing apparatus is provided which implements a demand side platform. The computing apparatus includes a processor, at least one memory device accessible by the processor, and a data communications interface operably associated with the processor. The memory device contains a body of program instructions including a machine learning model which is executable by the processor and configured to determine an estimate of likelihood of user interaction with a content item, the model having been trained using a set of enriched training feature vectors and corresponding interaction event tags derived from a matched data set generated from records relating to content placement events and records relating to user interaction events retrieved from an online data store wherein the placement and interaction events occur within a defined time period. The body of program instructions further includes instructions which, when executed by the processor, cause the computing apparatus to: receive, via the data communications interface, information relating to an online content placement slot and information relating to a user to whom content within the online content placement slot will be displayed; compute an enriched estimation feature vector based upon a content item selected for placement within the online content placement slot, the information relating to the user, and the information relating to the corresponding online content placement slot; and execute the machine learning model to determine an estimate of likelihood of the user interacting with the selected content item, based upon the enriched estimation feature vector.

In embodiments of the invention, the machine learning model is a generalized linear model comprising a plurality of model coefficients, and in particular the machine learning model may be a logistic regression model.

Advantageously, the plurality of model coefficients may be stored in a dictionary data structure in which each entry is defined by a key and a coefficient value, wherein each key comprises a hashed representation of a concatenation of a feature name and a corresponding feature value. The use of this type of data structure enables a prediction of the likelihood of a user interaction to be computed very rapidly, e.g., within 30 milliseconds. The program instructions may thus cause the computing apparatus to implement the action of executing the machine learning model by generating, for each feature value of the enriched estimation feature vector, a corresponding key; retrieving from the dictionary data structure, for each generated key, a corresponding coefficient value; and computing, using the enriched estimation feature vector and the retrieved coefficient values, the estimate of likelihood of the user interacting with the selected content item.

In embodiments in which the online content placement slot is an ad slot, the information relating to the ad slot and information relating to the user to whom content within the ad slot will be displayed is received along with a bid request message transmitted from an ad exchange server, and the content item comprises at least one offer for placement within the ad slot, the body of program instructions may further include instructions which, when executed by the processor, cause the computing apparatus to: transmit, to the ad exchange server, a bid response message in reply to the bid request message; in response to receiving, from the ad exchange server, a successful bid notification, update the online data store with content placement event data relating to placement of the content item; and in response to receiving a notification of a user interaction with the content item, updating the online data store with user interaction event data relating to the user interaction with the content item.

In embodiments of the invention, a computing apparatus is provided which implements training of a machine learning model configured to estimate of likelihood of user interaction with content items. The computing apparatus includes a processor, at least one memory device accessible by the processor, and a data store accessible by the processor. The memory device contains a body of program instructions including instructions which, when executed by the processor, cause the computing apparatus to: access the data store to retrieve records relating to content placement events, and records relating to user interaction events, wherein the placement and interaction events occur within a defined time period; match retrieved content placement event records with retrieved interaction event records to generate a matched data set which comprises a plurality of records, each record of the matched data set including a set of raw feature values derived from a content placement event along with an interaction event tag indicating whether or not an interaction event occurred corresponding with the content placement event; compute, from the raw feature values, a corresponding set of enriched training feature vectors; and train the machine learning model using the enriched training feature vectors and corresponding interaction event tags.

In embodiments of the invention, the machine learning model is a logistic regression model comprising a plurality of model coefficients, and the program instructions cause the computing apparatus to implement the action of training the machine learning model using regularized logistic regression with 'follow-the-regularized-leader' (FTRL)-proximal learning.

The body of program instructions may further include instructions which, when executed by the processor, cause the computing apparatus to, for each coefficient of the plurality of model coefficients, generate a key comprising a hashed representation of a feature name and a feature value corresponding with the coefficient; and store, in a dictionary data structure, a value of the coefficient in association with the key, whereby the dictionary data structure comprises an efficient encoding of the machine learning model.

The body of program instructions may include instructions which, when executed by the processor, cause the computing apparatus to repeatedly execute the actions of accessing the online data store, matching the retrieved content placement event records with the retrieved interaction event records, computing enriched training feature vectors, and training the machine learning model, to update the machine learning model.

In further aspects, the embodiments of the invention may provide tangible machine-readable media having executable program instructions stored thereon which are configured for execution on at least one computing apparatus comprising a processor, and which cause the apparatus to implement an embodiment of the invention according to one or more of the above-described aspects.

The above summary may present a simplified overview of some embodiments of the invention in order to provide a basic understanding of certain aspects of the embodiments of the invention discussed herein. The summary is not intended to provide an extensive overview of the embodiments of the invention, nor is it intended to identify any key or critical elements, or delineate the scope of the embodiments of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification and in which like reference numerals refer to like features, illustrate various embodiments of the invention and, together with the general description given above and the detailed description given below, serve to explain the embodiments of the invention.

DETAILED DESCRIPTION

Figure 1:
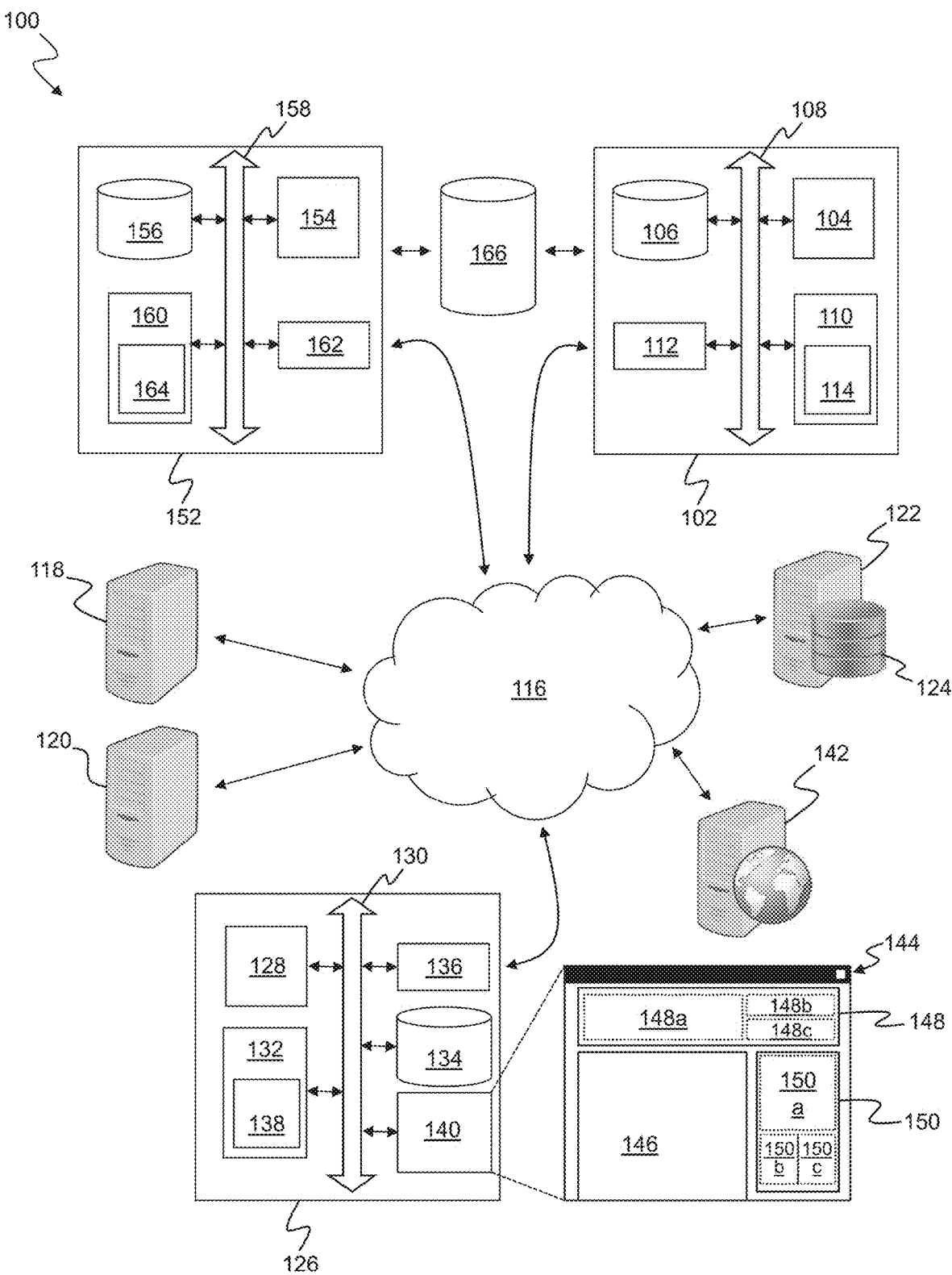
FIG. 1 is a schematic diagram illustrating an exemplary networked system in accordance with embodiments of the invention.

FIG. 1 is a block diagram illustrating an exemplary networked system 100 including a demand side platform (DSP) server 102, which is configured to implement a method of bidding for placement of advertising content in accordance with an embodiment of the invention. The DSP server 102 may comprise a computer system of a given architecture. In particular, the DSP server 102, as illustrated, comprises a processor 104 or more than one processors 104. The processor 104 is operably associated with at least one non-volatile memory/storage device 106, e.g., via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the DSP server 102.

Figure 2:
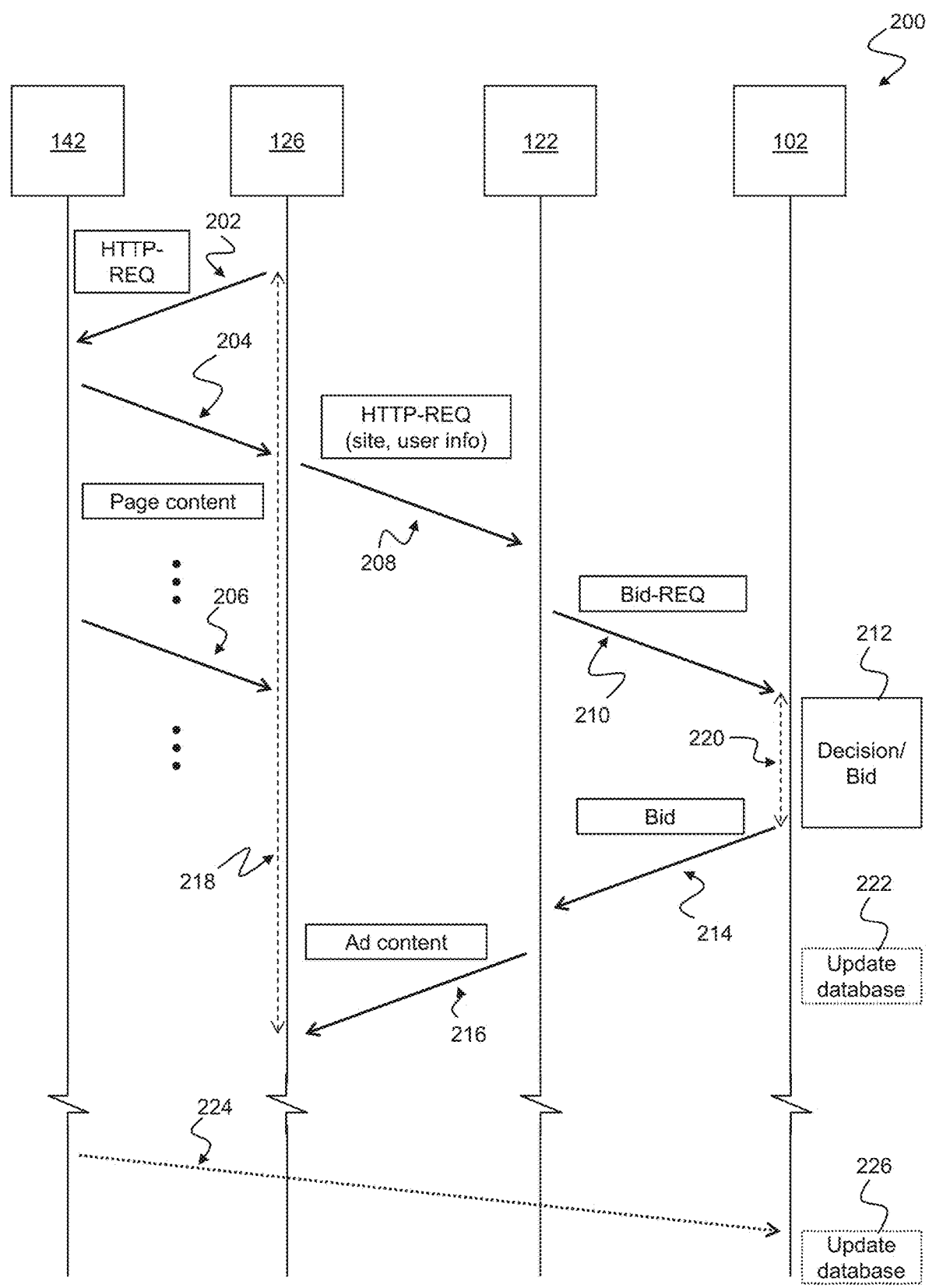
FIG. 2 shows a timeline of communications between a user device, a web server, an ad exchange server, and a DSP in accordance with embodiments of the invention.

The storage device 106 maintains program and data content relevant to the normal operation of the DSP server 102. For example, the storage device 106 may contain operating system programs and data, as well as other executable application software necessary for the intended functions of the authentication server 102. The storage device 106 also contains program instructions which, when executed by the processor 104, cause the DSP server 102 to perform operations relating to an embodiment of the present invention, such as are described in greater detail below, and with reference to FIGS. 2 and 6 in particular. In operation, instructions and data held on the storage device 106 are transferred to volatile memory 110 for execution on demand.

The processor 104 is also operably associated with a communications interface 112. The communications interface 112 facilitates access to a wide-area data communications network, such as the Internet 116.

In use, the volatile storage 110 contains a corresponding body of program instructions 114 transferred from the storage device 106 and configured to perform processing and other operations embodying features of the embodiments of the present invention.

With regard to the preceding overview of the DSP server 102, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), and/or other hardware devices suitable for efficient execution of required programs and algorithms. Computing systems may include personal computer architectures, or other general-purpose hardware platforms. Software may include open-source and/or commercially-available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the embodiments of the present invention, for ease of explanation and understanding the exemplary embodiments described herein are based upon single-processor general-purpose computing platforms, commonly available operating system platforms, and/or widely available consumer products, such as desktop PCs, notebook or laptop PCs, smartphones, tablet computers, and so forth.

In particular, the term 'processing unit' is used in this specification (including the claims) to refer to any suitable combination of hardware and software configured to perform a particular defined task, such as accessing and processing offline or online data, executing training actions of a machine learning model, or executing prediction actions of a machine learning model. Such a processing unit may comprise an executable code module executing at a single location on a single processing device, or may comprise cooperating executable code modules executing in multiple locations and/or on multiple processing devices. For example, in some embodiments of the invention, classification and bid decision processing may be performed entirely by code executing on DSP server 102, while in other embodiments corresponding processing may be performed in a distributed manner over a plurality of DSP servers.

Software components, e.g., program instructions 114, embodying features of the invention may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, and/or a range of languages suitable for implementation of network or web-based services, such as JavaScript, HTML, PHP, ASP, JSP, Ruby, Python, Perl, and so forth.

Returning to FIG. 1, the system 100 further comprises additional DSP servers, e.g., 118, 120 that, in use, compete with DSP server 102 to bid for placement of advertising content within online ad slots offered via an ad exchange server 122. The ad exchange server 122 implements a digital marketplace allowing advertisers and publishers of web sites and other online content to buy and sell advertising space in the form of a real-time, online auction in which each DSP server 102, 118, 120 is an automated, high-speed, bidder. The ad exchange server 122 comprises a database 124 in which it maintains details of online content providers (web servers) and advertisers (DSPs) for the purpose of operating a digital advertising marketplace.

The system 100 further includes user terminal devices, exemplified by terminal device 126. The terminal devices 126 may be, for example, desktop or portable PCs, smartphones, tablets, or other personal computing devices, and each comprise a processor 128 interfaced, e.g., via address/data bus 130, with volatile storage 132, non-volatile storage 134, and at least one data communications interface 136. The processor 128 is also interfaced to one or more user input/output (I/O) interfaces 140. The volatile storage 132 contains program instructions and transient data relating to the operation of the terminal device 126.

The terminal device storage 132, 134 may contain program and data content relevant to the normal operation of the device 126. This may include operating system programs and data (e.g., associated with a Windows, Android, iOS, MacOS, Linux, or other operating system), as well as other executable application software. The storage 132 also includes program instructions 138 which, when executed by the processor 128 enable the terminal device to provide a user with access to online content. For example, the program instructions 138 may implement a web browser having a graphical user interface (GUI) presented via the user I/O interface 140.

Accordingly, in the event that a user of the terminal device 126 access a web server 142, a corresponding web page display 144 is generated via the device UI 140. The display 144 include website content 146, and one or more advertising slots, e.g., 148, 150. As is further illustrated, each advertising slot 148, 150 may comprise a plurality of specific 'offers' on behalf of an advertiser. These offers are commonly arranged in a grid layout, e.g., as indicated by dashed rectangles 148a, 148b, 148c, 150a, 150b, 150c in FIG. 1. A number of communications actions then take place in order to populate these slots, i.e., to provide online advertisers with ad impressions within the web page display 144. These communications actions will now be described with reference to the timeline 200 illustrated in FIG. 2.

Initially, the user terminal 126, via the executing web browser application 138 and responsive to user input, transmits 202 an HTTP request to the web server 142 which includes a URL of desired web content. The web server 142 responds by transmitting 204 content, e.g., a web page in HTML format, to the user device 126. As will be appreciated by persons skilled in the art of web programming, the complete population and rendering of web page display 144 may require multiple requests and responses, and may involve further transactions with the web server 142 and/or with other online servers, such as content distribution network (CDN) servers and other web servers providing embedded content. For simplicity and to facilitate focus on communications embodying features of the present invention, all such known additional transactions are represented by a single exemplary communication 206 in FIG. 2.

In order to obtain advertising content to fill the slots 148, 150, the web page transmitted by the web server 142 to the user device 126 typically includes a hypertext reference ('href') directing the browser 138 to retrieve content from the ad exchange server 122 in accordance with an application programming interface (API) defined and provided by the relevant operator of the server 122. Accordingly, the user device 126 transmits 208 an HTTP request to the ad exchange server 122. The request includes web site information and user information relating to the user of the terminal device 126. Available user information may include information that the web server 142 has gathered, and may include client-side information, such as device and browser identity and technical details, identifying information and contents of browser cookies, and the like.

The ad exchange server 122 receives the request, identifies relevant DSP servers 102, 118, 120 in its database 124, and transmits 210 bid request messages to each selected DSP server. One such bid request message, including site and user information, is received at DSP server 102 embodying the present invention, which executes a process 212 in accordance with its specific programming 114 in order to predict a likelihood of user interaction with a selected ad including one or more offers, placed within one or more of the available slots 148, 150, and arrive at a bid decision. In the event that a decision is made to bid for the offered impression, and a bid value determined, the DSP server 102 then transmits 214 the bid to the ad exchange server 122.

The ad exchange server 122 receives all bids transmitted from DSP servers, including server 102, and selects a winning bid. It then retrieves ad content corresponding with the winning bid from its database 124, and transmits 216 the ad content to the user device 126 for rendering within the corresponding ad slot, e.g., 148 or 150.

From a user's perspective, the speed to fully load a web page should not be excessive. For example, a load time that exceeds a few seconds, e.g., 3 seconds 218, may be considered excessive. There are, as has been described above, many actions necessary to fully serve all content of a complex web page, which may involve multiple servers across the global internet. Accordingly, the duration of the bidding process facilitated by the ad exchange server 122 should be limited. For example, the DSP server 102 should make a bid decision in no more than a few tens of milliseconds, for example in under 30 milliseconds 220. This decision may be made with limited user information, and in view of the fact that a bad decision may have significant consequences for the advertiser. For example, if the DSP server wrongly determines that the user is a desirable target for a particular ad (i.e., computes a 'false positive'), it may place a relatively high winning bid and incur a real cost with little or no prospect of any return. Conversely, if the DSP server wrongly determines that the user is not a desirable target for the ad (i.e., computes a 'false negative'), it may place no bid, or a low losing bid, and cause the advertiser to miss an opportunity to obtain an impression with a real prospect of a return.

In order to achieve quality decision-making at high speed in the context of travel booking services, embodiments of the present invention employ a machine learning approach. To further facilitate understanding of this approach, reference is now made back to FIG. 1, in which the system 100 further includes a machine learning server ('ML server') 152, which is configured to process raw data relating to placement of content (i.e., ads/offers) along with user interactions (i.e., user clicks on ads/offers), to generate training data sets for a machine learning model, and to train the machine learning model for deployment to the DSP server 102. The processing, training and deployment actions are described in greater detail below, with reference to FIGS. 3 and 4, and may be carried out continuously, periodically and/or on-demand in order to maintain currency of the machine learning model.

As with the DSP server 102, the ML server 152 may comprise a computer system having a conventional architecture, e.g., comprising a processor 154 that is operably associated with a non-volatile memory/storage device 156, via one or more data/address busses 158 as shown. The processor 154 is also interfaced to volatile storage 160 which contains program instructions and transient data relating to the operation of the ML server 152. Conventionally, the storage device 156 contains operating system programs and data, as well as other executable application software necessary for the intended functions of the ML server 152, and including program instructions which, when executed by the processor 154, cause the ML server 152 to perform operations relating to an embodiment of the present invention, such as are described in greater detail below with reference to FIGS. 3 and 4 in particular. In operation, instructions and data held on the storage device 156 are transferred to volatile memory 132 for execution on demand. Additionally, the processor 154 is operably associated with a communications interface 162 in a conventional manner, providing access to the Internet 116.

In use, the volatile storage 160 contains a corresponding body of program instructions 164 transferred from the storage device 156 and configured to perform processing, training and deployment actions embodying the present invention. The program instructions 164 comprise a further specific technical contribution to the art in accordance with the invention.

The system 100 further includes at least one database 166, which is configured to store raw historical data relating to placement of content (i.e., ads/offers) along with user interactions (i.e., user clicks on ads/offers). The volume of such data may be very large over time periods of interest, such as one month or more. For example, in a particular live deployment, it was found that a log of data for a single day comprises on the order of 20 million lines (i.e., placement and interaction events) having a total storage size on the order of 10 Gb. Accordingly, the database 166 is preferably implemented using technologies that are optimized for efficient storage, retrieval and update of very large volumes of data (sometimes referred to as 'big data') across multiple database servers and storage devices. While a number of suitable commercial and open source technologies exist for implementation of the database 166, an exemplary experimental embodiment has been implemented using Apache Hadoop framework, with data stored in Parquet format on HDFS (Hadoop Distributed File System), and using Impala to provide a high-speed, SQL-like query engine. This implementation has been tested and found to provide more than adequate performance for practical online deployment of embodiments of the invention.

The database 166 is accessible to both the DSP server 102 and the ML server 152. In FIG. 1, logical access is illustrated by corresponding arrows. In a practical embodiment, physical access between the database 166 and the DSP and ML servers 102, 152 may be via the Internet 116, and/or via other dedicated communications links or networks, such as a local storage area network (SAN). The DSP server 102 is configured to update the database 166, in real time, with raw data relating to placement and interaction events. The ML server 152 is configured to retrieve the raw data from the database 166 and to carry out processing, training and deployment actions, based on the retrieved data, in accordance with an embodiment of the invention.

Returning to FIG. 2, further operations relating to update of the database 166 by the DSP server 102 are illustrated. In particular, in the event that the DSP server 102 places a successful bid, and corresponding ad content is transmitted 216 to the user device 126, the DSP server 102 updates 222 the database 166, adding data relating to the placement of the ad (i.e., ad/offer impression). Code associated with the ad is configured such that, in the event that the user subsequently interacts with (i.e., clicks on) the ad, the DSP server 102 receives, either directly or indirectly, a notification 224 of this interaction event. The DSP server 102 then updates 226 the database 166 with details of the interaction event. In this way, the database 166 is continuously updated with raw data relating to all placement and interactions events known to the DSP server 102.

Figure 3:
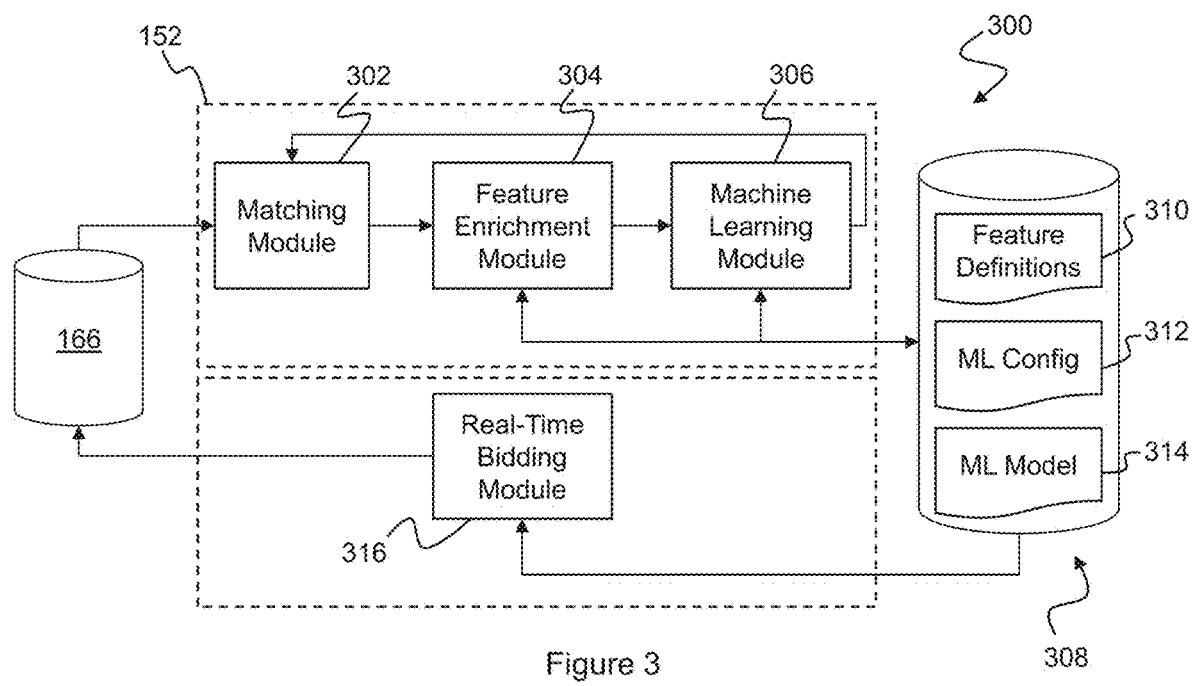
FIG. 3 is a block diagram illustrating schematically a number of code modules comprising an online user interaction prediction engine in accordance with embodiments of the invention.
Figure 4:
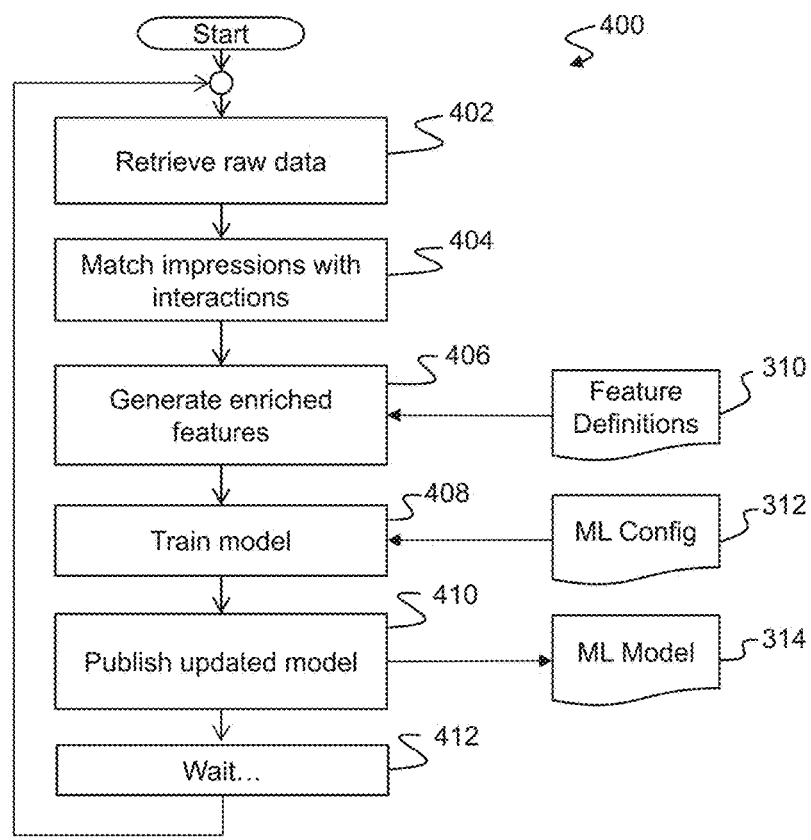
FIG. 4 shows a flowchart of a method of online updating of a machine learning model in accordance with embodiments of the invention.

FIG. 3 is a block diagram illustrating schematically a number of code modules that together comprise an online user interaction prediction engine 300 embodying the invention. Implementation of the user interaction prediction engine 300 is distributed across the ML server 152 and DSP server 102, as shown by the dashed boxes in FIG. 3. Three code modules make up the ML server component of the engine 300, namely a matching module 302, a feature enrichment module 304 and a machine learning module 306. These three modules are all implemented within the program instructions 164 executing on the ML server 152. The functionality implemented within each of these modules will now be described in greater detail.

The purpose of the matching module 302 is to match placement events (i.e., display of ads, and offers within ads, in ad slots 148, 150 of the display 144 of the user device 126) to subsequent interaction events (i.e., instances of a user clicking on an offer within an ad placed on the display 144 of the user device 126). Matching enables placement events to be tagged as 'clicked' or 'not clicked', so that they can be used by machine learning module 306 in training of a supervised machine learning model for prediction of user interaction events based upon placement event data. Additionally, matching enables placement event data to be combined with corresponding interaction event data to create a record for clicked ads containing all available information regarding placement and interaction.

Matching presents a challenge because there is no explicit link between a placement event (ad impression) and a subsequent user interaction (ad click). As illustrated in the time line 200 of FIG. 2, a user interaction may occur at any time following placement, e.g., following a substantial delay. Since new placement and/or interaction events may occur at a very high rate (e.g., hundreds or thousands of times per second) in a live system, corresponding placement and interaction events may become widely separated in the database 166. Additionally, the rate of interaction events may be very low, e.g., it is generally reported that the click through rate (CTR) for web-based display advertising is on the order of 0.05%. Furthermore, it is desirable to link placement and interaction events at offer level, rather than only at ad level.

The general approach employed for matching in embodiments of the invention is to identify, in the database 166, placement events and subsequent interaction events within a predetermined time window that have a selected set of matching parameters. The time window should be of sufficient duration to capture a substantial majority of all interactions, and the number and choice of parameters should be sufficient to ensure unique matching in a substantial majority of cases. Perfect matching may be difficult to achieve, because it is impossible to know if or when an interaction will occur. A time window of longer duration will capture interactions that occur after longer delays, but will also increase the risk of erroneous matching where, for example, a user interacts with a subsequently-presented ad having similar parameters. Similarly, the risk of erroneous matching can be reduced by using a larger selected set of parameters to distinguish between presented ads, at the expense of making the matching process more complex.

In exemplary experimental embodiment, the invention has been implemented in the context of a domain-specific DSP server operating on behalf of advertisers, using event data captured from a live system. A heuristic approach was taken to design of the matching module, with a number of experiments being conducted to determine a suitable time window, and a selected set of parameters. An 80 second time window was found to be effective in combination with matching the following event parameters: unique user identifier (tracked via a browser cookie); advertiser identifier; publisher identifier (i.e., the ad exchange/distribution network through which the ad was placed); format of the clicked offer (e.g., width and height of offer graphic, in pixels); ad product type; ad product pool; user segment (a combination of a user product segment, based upon a product such as flight, hotel or restaurant previously viewed by the user, and a user time segment, indicating how long it has been since the last activity of the user); site URL; ad slot visibility; user device; a measure of distance between a destination (location) about which the user was seeking information and a destination that was the subject of a specific offer; and ad slot key (a stable identifier for the combination of publisher, ad slot and page).

In the exemplary embodiment, matching is performed using an Impala SQL query to select and join tables of records of placement and interaction events on the values of fields corresponding with the parameters listed above. Specifically, placement records are LEFT JOINed to interaction records, such that the resulting table includes a row for each placement event. Each row comprises a set of values of raw features derived from the matched events, along with an indicator of whether or not an interaction event, i.e., ad/offer click, occurred. The table of matched data is input to the feature enrichment module 304.

The function of the feature enrichment module 304 is to derive, from the values of raw features in the matched data table generated by the matching module 302, a corresponding set of enriched feature vectors for use by the machine learning module 306. A process for determining a suitable set of enriched features (i.e., feature engineering) is described in detail below with reference to FIG. 5. In FIG. 3, definitions of enriched features for use by the feature enrichment module 304 are shown as being stored in a file 310 within data store 308, however this may be regarded as a schematic convenience. In a practical embodiment, feature definitions may be stored in this way, may be compiled into a code module and linked to the feature enrichment module 304, or may be hard-coded into the feature enrichment module. As will be appreciated, each of these implementation options potentially offers a different trade-off between flexibility, code complexity and execution speed.

In the exemplary embodiment, all of the enriched features are of categorical type (i.e., take on one of a number of discrete values), and are one-hot encoded. The resulting feature vectors are therefore generally relatively sparse, and comprise binary elements. Furthermore, each feature vector corresponds with an offer within an ad presented to a user, and is associated with a binary tag indicating whether or not the user interacted with (i.e., clicked on) the offer. The resulting table of feature vectors and tags is input to the machine learning module 306.

The machine learning module 306 comprises program code executing on the ML server 152, and configured in the exemplary experimental embodiment to implement a generalised linear model. Specifically, the machine learning module 306 of the exemplary embodiment implements a regularized logistic regression algorithm, with 'follow-the-regularized-leader' (FTRL)-proximal learning. Advantageously, this machine learning algorithm is effective in the case of highly unbalanced datasets (noting that only around 0.05% of samples in the table of feature vectors are tagged as 'clicked'). The algorithm has a number of hyperparameters that can be adjusted in order to optimize its learning accuracy on the training data for a specific problem. A process for determining a suitable set of values for the hyperparameters is described in detail below with reference to FIG. 5. In FIG. 3, fixed values of the hyperparameters for use by the machine learning module 306 are shown as being stored in a file 312 within data store 308. As will be appreciated, however, alternative implementations are possible, such as hard-coding the parameters into the machine learning module 306.

Figure 6:
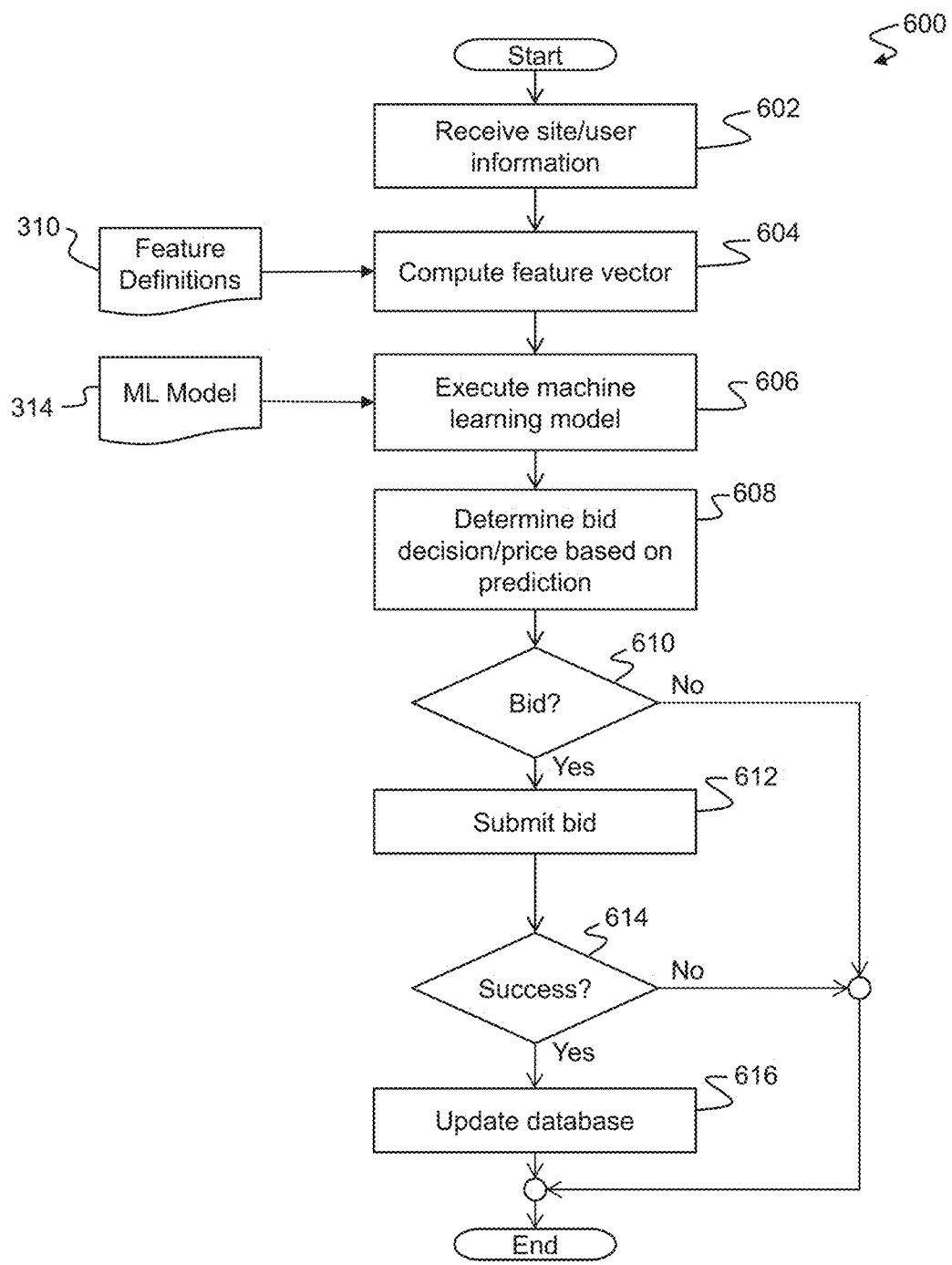
FIG. 6 shows a flowchart of a method of operating a real-time bidding module according to embodiments of the invention.

Execution of the machine learning module 306 on a particular dataset results in the generation of a model that can be executed by the DSP server 102, as will be described in greater detail below with reference to FIG. 6. In particular, a logistic regression model is wholly characterised by a set of coefficients associated with elements of the input feature vector. In the exemplary embodiment, a particularly efficient representation of the model is employed, to enable the DSP server 102 to compute a prediction of the likelihood of a user interaction very rapidly, i.e., well within the 30 millisecond target window 220 for generating a bid decision. Specifically, the coefficients are stored in a dictionary data structure in which each entry is defined by a key and a value. The key is a hashed representation of a concatenation of the feature name (i.e., column label in the feature table) and a corresponding feature value (i.e., categorical values prior to one-hot coding). The associated value in the dictionary is simply the corresponding model coefficient. This type of data structure provides extremely fast lookup, particularly for sparse feature sets. In particular, by using hashed values a limit on the number of hashed features may be imposed (a scheme sometimes referred to as the 'hashing trick'). This scheme can be used to greatly speed lookup and computation, at the expense of possible collisions in dictionary key values. Advantageously, however, the statistical effect of these collisions can be neglected from the perspective of overall performance of the algorithm.

For deployment to the DSP server 102, the model data structure is serialized in a binary format (in the exemplary embodiment, the Python 'pickle' format is used), and stored in a model file 314 in data store 308.

In use, the ML server 152 executes the modules 302, 304, 306 repeatedly, e.g., continuously, periodically, or on-demand. This is illustrated by the flowchart 400 shown in FIG. 4. Raw data is retrieved from the database 166 at block 402. Exemplary embodiments use a predetermined period of recent data, which is considered to be representative of the behavior of current online users of the system 100. For example, raw data from the most recent one-month period may be employed. At block 404, the matching module 302 performs matching of placement and interaction events, as has been described. In practice, retrieval 402 and matching 404 blocks may be combined as a single query, e.g., an Impala SQL query.

At block 406, the ML server 152 executes the feature enrichment module, which uses the enriched feature definitions 310 to compute enriched feature vectors corresponding with the matched data. These are transferred to the machine learning module 306 which trains 408 the model using the tagged feature vectors and the predetermined hyperparameters defined in the configuration file 312. The resulting model coefficients are hashed, serialised and published 410 to the model file 314.

Optionally, the ML server then waits 412, before recommencing the process at block 402. Exit from the wait condition 412 may be triggered by a number of different events. For example, the ML server may be configured to run the modules 302, 304, 306 periodically, e.g., once per day. Alternatively, or additionally, it may be configured to run the modules 302, 304, 306 on-demand, e.g., upon receipt of a signal from a controller (not shown) within the system 100. In some embodiments the ML server may run the modules 302, 304, 306 continuously, thereby updating the model file 314 as frequently as possible based upon the time required for data matching, feature enrichment and model training. In an exemplary experimental configuration, it was found that updates based upon 30 minute batches of data provided a suitable trade-off between quality of the output of the matching module 302 (i.e., the need to reconcile interaction and placement events accurately for a good training dataset), and reactivity to the real-time changes in the ad exchange network (e.g., new campaign launches, entry/exit of competitors, changes in user demand for some contents, and so forth).

Figure 5:
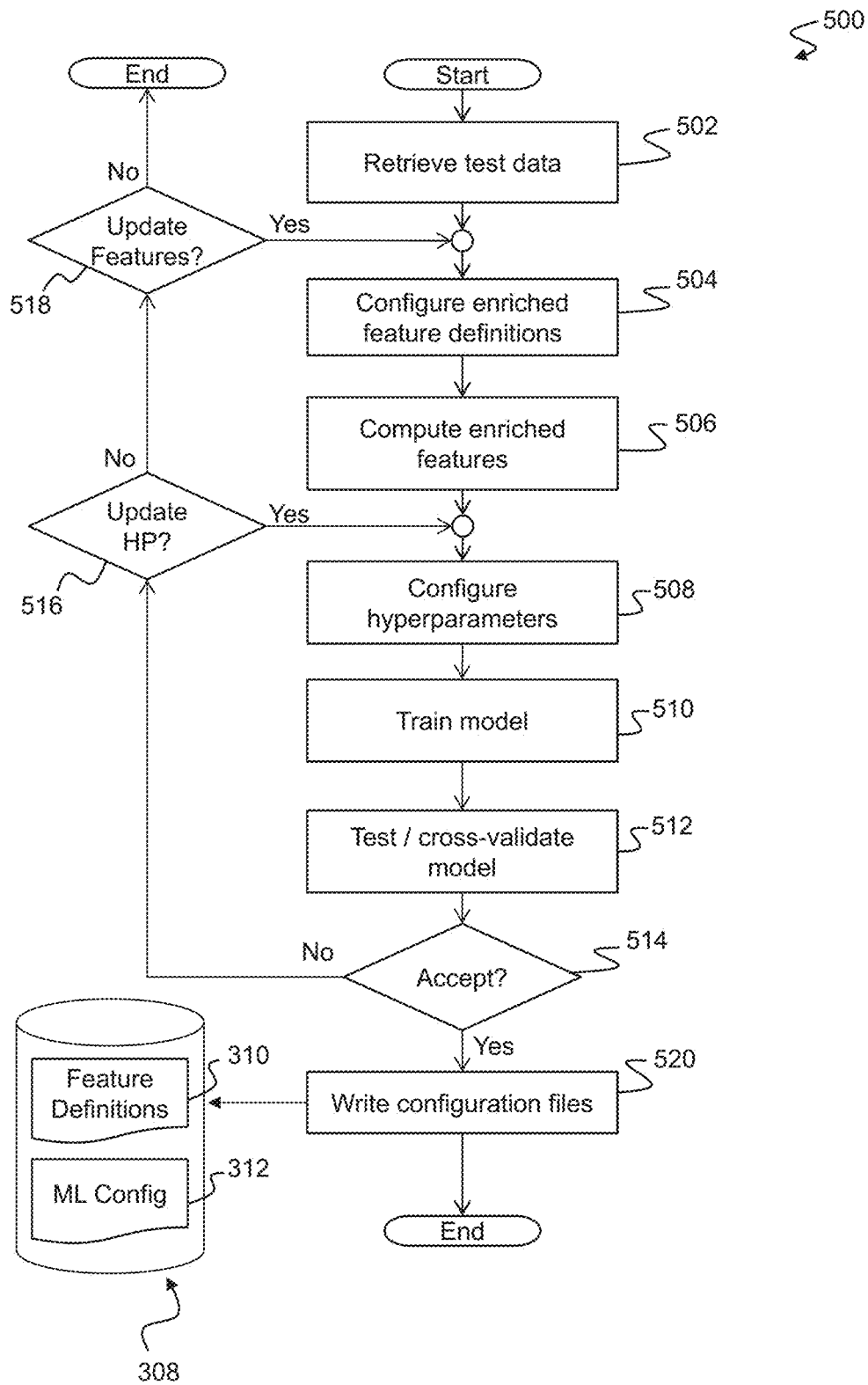
FIG. 5 shows a flowchart of a method of feature engineering and model hyperparameter optimization according to embodiments of the invention.

Turning now to FIG. 5 there is shown a flowchart 500 of a process of feature engineering and model hyperparameter optimisation according to an embodiment of the invention. In practice, the process 500 is partially automated, and operated under human supervision. The development of suitable features with strong predictive capability, and the selection of appropriate ranges of model hyperparameters involves significant experience, judgment, creativity and ingenuity, and in most cases cannot efficiently be fully-automated.

The process 500 requires a set of test data, which is retrieved at block 502, and which may be obtained in the same manner as described above in relation to the functionality of the matching module 302. In particular, data may be extracted from the database 166 for a selected test period using an Impala SQL query of the same form as that used by the matching module 302.

At block 504, a set of enriched features is defined and configured. In the exemplary embodiment, this block involves application of judgment, creativity and ingenuity of an experienced data scientist. In practice, a number of experiments have been performed, according to the process 500 and supported by further analysis of the test data set, in order to identify an effective set of enriched features. At block 506, values of the defined enriched features are computed from the raw test data set.

At block 508, a set of hyperparameter values is selected and a machine learning model is configured with the selected values. At block 510 the resulting model is trained using the enriched test data. Typically, a portion of the test data is held back in the training block 510, which is then used in a cross-validation block 512 to assess the performance of the trained model on data that was not seen during the training block 510.

Performance of the trained model is then assessed at decision block 514, to determine whether or not it is acceptable, for example by reaching some optimal or sufficient level of performance. The choice of criteria for assessing performance may be relevant to identifying an acceptable model. Various known criteria may be employed, such as Area Under the Receiver Operating Curve (AUROC), log loss, or Gini (which is related to the AUROC). In the exemplary embodiment, a combination of Gini (which takes values between −1 and 1, and is desirably as high as possible) and log loss (which is desirably as low as possible) was used to assess performance of different models. This approach was employed not only for different hyperparameters of the selected FTRL-Proximal model, but also for a number of alternative models, including decision trees (distributed random forest, gradient boosted trees), naïve Bayes, and deep learning networks, which were consequently rejected as providing inferior performance on the analysed datasets.

In the event that performance is deemed unacceptable, or an optimisation process is incomplete, at decision 514, a further decision 516 is made as to whether the model hyperparameters. The resulting loop of configuring hyperparameters, training and testing the model is typically automated using an algorithm such as grid search, or similar. The role of the supervising data scientist in this case is to determine suitable ranges for the grid of hyperparameters.

In the event that no further variation of hyperparameters is required, an outer loop, implemented via decision 518, allows for the testing of alternative sets of enriched features. If available selections and values of model algorithms, hyperparameters and enriched features have been exhausted without identifying an acceptable model, then the process 500 may be regarded as having failed, and a reconsideration of strategy may be required. For the purposes of the exemplary embodiment, however, the process 500 led to a model with acceptable performance. At block 520, therefore, the identified enriched feature definitions and model hyperparameters are written to the data files 310, 312 in the data store 308. A summary of the enriched features developed via the process 500 is presented in Table 1.

ing on the DSP server 102. The real-time bidding module 316 employs the enriched feature definitions 310 and the trained model representation 314. In particular, the operation of the real-time bidding module 316 is represented by the flow chart 600 shown in FIG. 6 in which, at block 602, site and user information is received, i.e., via transmission 210 from the ad exchange server 122. This information is used at block 604 to compute a corresponding enriched feature vector according to the definitions 310.

At block 606, the real-time bidding module accesses the model representation which, as has been described, comprises a set of coefficients stored in a highly efficient dictionary structure for rapid coefficient lookup. As described above, with reference to FIG. 4 in particular, the model may be updated from time-to-time by the ML server 152. The model representation 314 may be stored in a shared storage medium 308, and be asynchronously readable by the DSP server 102. In some embodiments, the DSP server may maintain a cached copy of the model representation 314 for rapid access, which is updated upon update of the stored file by the ML server 152.

TABLE 1

Summary of enriched features

| Feature Name | Feature Description |
| --- | --- |
| ts_day_of_week | The day of the week (Sun-Sat) of the placement event. |
| ts_hour_of_day | The hour of the day (00-23) of the placement event. |
| ts_is_weekend | Whether the placement event occurred on a weekend. |
| ts_is_bank_holiday | Whether the placement event occurred on a bank holiday in the country from which the user accessed a site. |
| publisher_id | Identifier of publisher (i.e., operator of ad exchange server). |
| advertiser_id | Identifier of advertiser. |
| offer_key | A unique offer identifier, created by combining advertiser_id (see above) and other advertiser fields (product type and product pool). |
| ad_dst_top199 | A destination associated with an offer. Limited to the top 199 destinations, which were found in feature engineering experiments to capture 92% of all clicks. |
| fmt | Format of an offer (width and height of offer image within ad slot) |
| nb_offers_per_ad | Number of offers included with the ad slot. |
| mq_dst | Proximity/distance of destination of interest to the user and destination associated with an offer. A categorical value indicating closeness of match on a set scale. |
| user_pseg | Identifier of a product segment previously viewed by user (e.g., flight, accommodation, restaurant). |
| user_tseg | Identifier of a time segment of the user's previous activity (e.g., within last day, 24-48 hours ago, . . . , 8-30 days ago). |
| domain_name_top99 | Domain name of site in which ad slot is displayed. Limited to the top 99 domains, which were found in feature engineering experiments to capture 95% of all clicks. |
| slot_visibility | Visibility of ad slot within page on user display. |
| device | User device identifier. |
| fmt_device | An engineered feature comprising a combination of offer format (fmt) and user device identifier (device). |
| ad_slot_key_top499 | A unique identifier for the combination of publisher, ad slot, and page. Limited to the top 499 values, which were found in feature engineering experiments to capture 97% of all clicks. |
| camp_type | Categorical identifier of campaign type associated with an offer (e.g., text + image, image, display banner with dynamic content, static display banner). |
| user_country_top3 | The country from which the user accessed a site. Limited to the top three countries, which were found in feature engineering experiments to capture over 99% of all traffic. Note, however, that the number and identity of top countries is specific to a publisher/ad exchange, which may be region and language specific. |
| offer_pos | A categorical value indicating the placement of an offer within an ad slot. |
| browser | Identifier of user browser (e.g., Chrome, IE, Safari, etc). |

Returning to FIG. 3, the online user interaction prediction engine 300 includes a real-time bidding module 316, which is implemented within the program instructions 114 executing on the DSP server 102. The real-time bidding module The output of the model is an estimate of likelihood of user interaction with an offer within a selected ad, based on the enriched feature vector. In the exemplary embodiment, the output is a value representing a probability that the user will click on an offer within the selected ad. This value is used in a bid decision process at block 608. The process 608 may include determining whether or not to bid at all, and/or a determination of a particular price to bid for the available ad slot. For example, a threshold may be applied, such that if the value is below the threshold then no bid is made. In some embodiments, a bid amount may be determined based upon the magnitude of the value, such that a higher price is bid if the model indicates a higher likelihood that the user will click on an offer within the selected ad. In the event that a decision is made to bid for the slot, control is directed 610 to block 612 wherein the bid information is transmitted 214 back to the ad exchange server 122. In the event that the bid is successful, control is directed 614 to block 616, in which the database 166 is updated with details of the placement event.

In order to assess the performance of the real-time bidding module 316 embodying the invention, an experimental module was run in parallel with a number of modules implementing a conventional bidding algorithm. The results are shown in the charts of FIGS. 7(*a*) and 7(*b*).

Figure 7A:
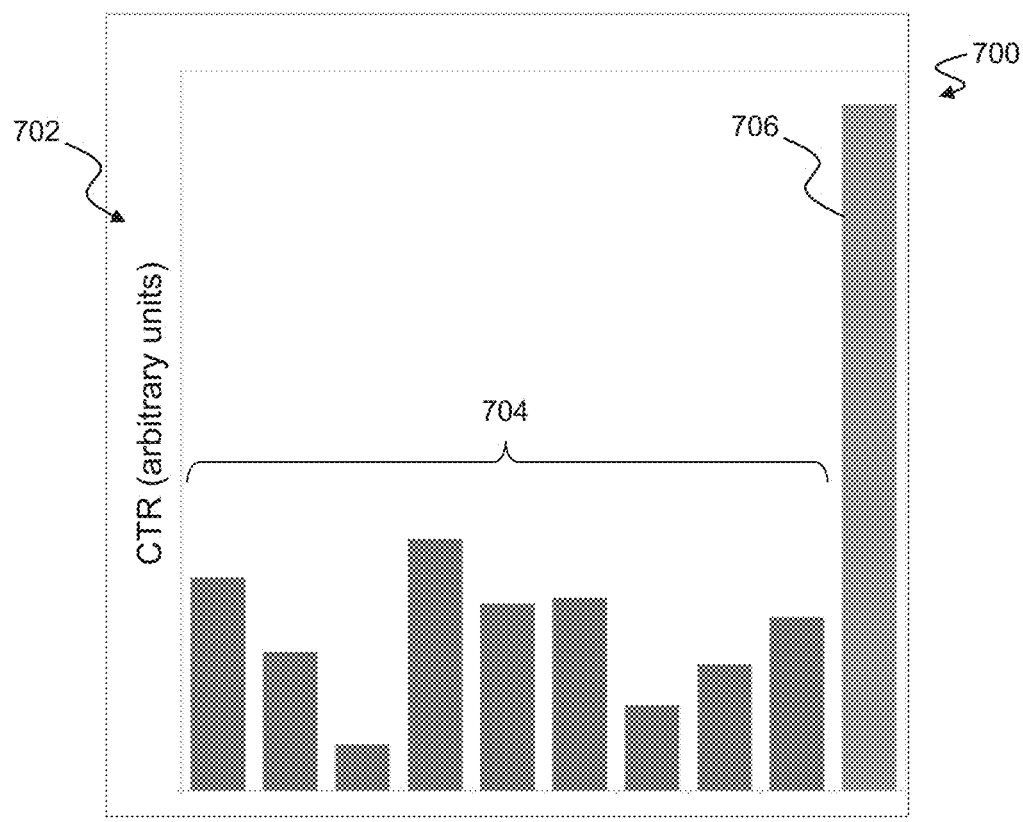
FIGS. 7(a) and 7(b) show charts illustrating performance of a real-time bidding module in accordance with embodiments of the invention.
Figure 7B:
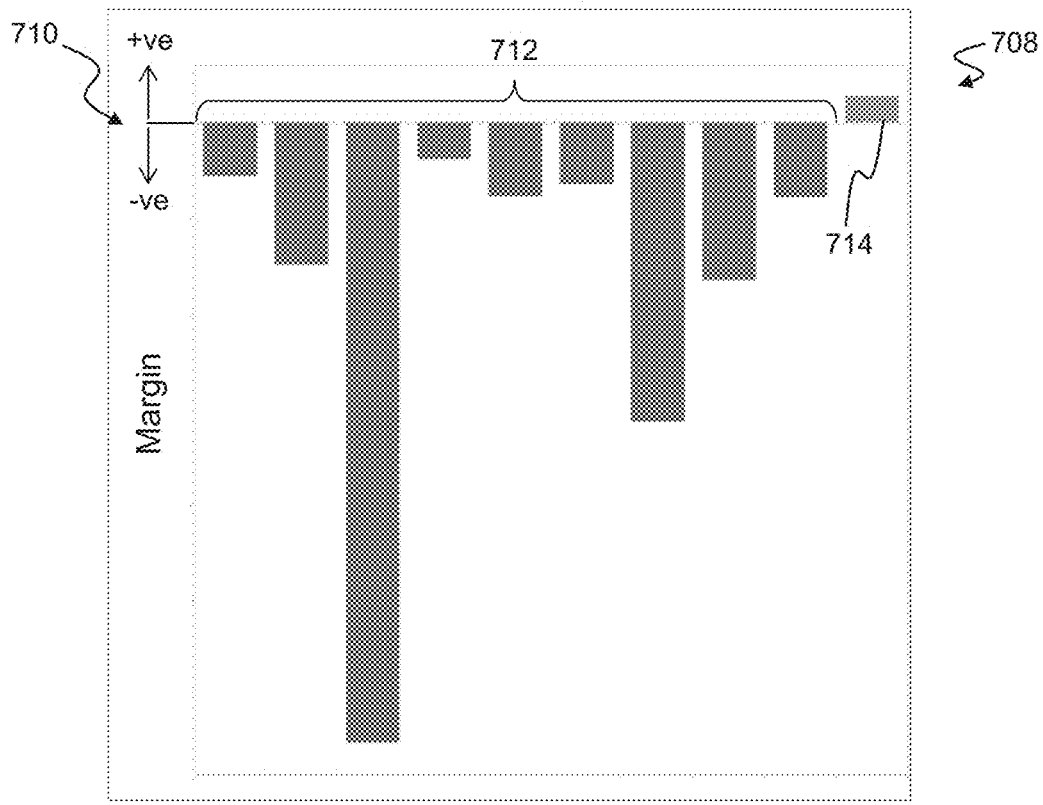

In particular, FIG. 7(*a*) is a chart 700 having click through rate (CTR) on the vertical axis 702, with the corresponding performance of ten bidding modules shown as a series of bars. The bars 704 represent the performance of nine conventional bidding modules, while the bar 706 represents the performance of the experimental bidder embodying the invention. As can be seen, the experimental bidder achieved a CTR of around five times the average performance of the conventional bidders.

FIG. 7(*b*) is a chart 708 having margin, defined as net profit divided by cost, on the vertical axis 710. The bars 712 represent the performance of the nine conventional bidding modules, all of which operated at a loss. However, the experimental bidder, represented by the bar 714, was able to operate at a profit.

The results in FIGS. 7(*a*) and 7(*b*) thus clearly demonstrate the technical and practical superiority achievable by the embodiments of the invention over conventional methods of predicting online user interaction.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computing system comprising a demand side platform (DSP) server, the DSP server comprising:
    one or more processors;
    at least one memory device coupled with the one or more processors; and
    a data communications interface operably associated with the one or more processors, wherein the memory device contains a plurality of program instructions including a machine learning model which is executable by the one or more processors and configured to determine an estimate of likelihood of user interaction with a content item, the model having been trained using a set of enriched training feature vectors and corresponding interaction event tags derived from a matched data set generated from records relating to content placement events and records relating to user interaction events retrieved from an online data store,
    wherein the machine learning model is a logistic regression model comprising a plurality of model coefficients that are stored in a dictionary data structure in which each entry is defined by a key and a coefficient value, and each key comprises a hashed representation of a concatenation of a feature name and a corresponding feature value,
    wherein the machine learning model implements a regularized logistic regression algorithm that includes 'follow-the-regularized-leader' (FTRL)-proximal learning that is trained based on associated hyperparameters to optimize learning accuracy on the set of enriched training feature vectors and the corresponding interaction event tags,
    wherein each record of the matched data set includes a set of raw feature values derived from an associated content placement event along with a corresponding interaction event tag indicating whether or not an interaction event occurred corresponding with the content placement event,
    wherein the content placement events and the user interaction events occur within a defined time period, and
    wherein the plurality of program instructions, when executed by the one or more processors, cause the DSP server to:
    receive, via the data communications interface, information relating to an online content placement slot;
    receive, via the data communications interface, information relating to a user to whom content within the online content placement slot will be displayed within the defined time period;
    compute an enriched estimation feature vector based upon: (i) a content item selected for placement within the online content placement slot that will be displayed within the defined time period, (ii) the information relating to the user, and (iii) the information relating to the online content placement slot;
    generate, for each feature value of the enriched estimation feature vector, a corresponding key;
    retrieve from the dictionary data structure, for each generated key, a corresponding coefficient value;
    determine, by the one or more processors executing the machine learning model, an estimate of likelihood of the user interacting with the selected content item within the defined time period based upon the enriched estimation feature vector and the retrieved corresponding coefficient value, wherein the estimate of likelihood of the user interacting with the selected content item comprises a value representing a probability that the user will interact with the selected content item within the defined time period; and
    determine, based upon the estimate of likelihood of the user interacting with the selected content item within the defined time period, a bid amount for the selected content item for placement within the online content placement slot that will be displayed within the defined time period based on a magnitude of the value with respect to a bid threshold.

2. The system of claim 1 wherein the online content placement slot is an ad slot, the information relating to the ad slot and information relating to the user to whom content within the ad slot will be displayed is received along with a bid request message transmitted from an ad exchange server, the content item comprises at least one offer for placement within the ad slot, and the instructions, when executed by the one or more processors, cause the DSP server to:
    transmit, to the ad exchange server, a bid response message in reply to the bid request message;
    in response to receiving, from the ad exchange server, a successful bid notification, update an online data store with content placement event data relating to placement of the content item; and
    in response to receiving a notification of a user interaction with the content item, update the online data store with user interaction event data relating to the user interaction with the content item.

3. A method comprising:
    at a demand side platform (DSP) server having one or more processors:
    accessing an online data store to retrieve records relating to content placement events, and records relating to user interaction events, wherein the content placement events and interaction events occur within a defined time period;
    matching retrieved content placement event records with retrieved interaction event records to generate a matched data set which comprises a plurality of records, each record of the matched data set including a set of raw feature values derived from a content placement event along with an interaction event tag indicating whether or not an interaction event occurred corresponding with the content placement event, wherein the content placement event and the user interaction event occurs within a defined time period;

computing, from the set of raw feature values, a corresponding set of enriched training feature vectors;

training a machine learning model using the corresponding set of enriched training feature vectors and corresponding interaction event tags, wherein the machine learning model is a logistic regression model comprising a plurality of model coefficients that are stored in a dictionary data structure in which each entry is defined by a key and a coefficient value, and each key comprises a hashed representation of a concatenation of a feature name and a corresponding feature value, and wherein the machine learning model implements a regularized logistic regression algorithm that includes 'follow-the-regularized-leader' (FTRL)-proximal learning that is trained based on associated hyperparameters to optimize learning accuracy on the set of enriched training feature vectors and corresponding interaction event tags;

receiving, at one or more processors configured to execute the machine learning model, information relating to an online content placement slot and information relating to a user to whom content within the online content placement slot will be displayed within the defined time period;

computing, by the one or more processors, an enriched estimation feature vector based upon: (i) a content item selected for placement within the online content placement slot that will be displayed within the defined time period, (ii) the information relating to the user, and (iii) the information relating to the online content placement slot;

generating, for each feature value of the enriched estimation feature vector, a corresponding key;

retrieving from the dictionary data structure, for each generated key, a corresponding coefficient value;

determining, by the one or more processors executing the machine learning model, an estimate of likelihood of the user interacting with the selected content item within the defined time period, based upon the enriched estimation feature vector and the retrieved corresponding coefficient value, wherein the estimate of likelihood of the user interacting with the selected content item comprises a value representing a probability that the user will interact with the selected content item within the defined time period; and determining, based upon the estimate of likelihood of the user interacting with the selected content item within the defined time period, a bid amount for the selected content item for placement within the online content placement slot that will be displayed within the defined time period based on a magnitude of the value with respect to a bid threshold.

4. The method of claim 3 wherein:
the online content placement slot is an ad slot;
the information relating to the ad slot and information relating to the user to whom content within the ad slot will be displayed is received along with a bid request message transmitted from an ad exchange server; and
the content item comprises at least one offer for placement within the ad slot.

5. The method of claim 4 further comprising:
transmitting, to the ad exchange server by the one or more processors, a bid response message in reply to the bid request message;
receiving, by the one or more processors from the ad exchange server, a successful bid notification; and
updating, by the one or more processors, the online data store with content placement event data relating to placement of the content item.

6. The method of claim 5 further comprising:
receiving, by the one or more processors, a notification of a user interaction with the content item; and
updating the online data store with user interaction event data relating to the user interaction with the content item.

7. The method of claim 6 wherein accessing the online data store, matching the retrieved content placement event records with the retrieved interaction event records, computing enriched training feature vectors, and training the machine learning model, are repeatedly executed to update the machine learning model.

8. A non-transitory computer readable storage medium comprising program code including instructions that, when executed by one or more processors of a demand side platform (DSP) server, cause the one or more processors of the DSP server to:
implement a machine learning model which is executable by the one or more processors of the DSP server and configured to determine an estimate of likelihood of user interaction with a content item, the model having been trained using a set of enriched training feature vectors and corresponding interaction event tags derived from a matched data set generated from records relating to content placement events and records relating to user interaction events retrieved from an online data store,
wherein the machine learning model is a logistic regression model comprising a plurality of model coefficients that are stored in a dictionary data structure in which each entry is defined by a key and a coefficient value, and each key comprises a hashed representation of a concatenation of a feature name and a corresponding feature value,
wherein the machine learning model implements a regularized logistic regression algorithm that includes 'follow-the-regularized-leader' (FTRL)-proximal learning that is trained based on associated hyperparameters to optimize learning accuracy on the set of enriched training feature vectors and corresponding interaction event tags,
wherein each record of the matched data set includes a set of raw feature values derived from an associated content placement event along with a corresponding interaction event tag indicating whether or not an interaction event occurred corresponding with the content placement event,
wherein the content placement events and the user interaction events occur within a defined time period, and
wherein the instructions, when executed by the one or more processors of the DSP server, cause the one or more processors of the DSP server to:
receive, via the data communications interface, information relating to an online content placement slot;
receive, via the data communications interface, information relating to a user to whom content within the online content placement slot will be displayed within the defined time period;

compute an enriched estimation feature vector based upon: (i) a content item selected for placement within the online content placement slot that will be displayed within the defined time period, (ii) the information relating to the user, and (iii) the information relating to the online content placement slot;

generate, for each feature value of the enriched estimation feature vector, a corresponding key;

retrieve from the dictionary data structure, for each generated key, a corresponding coefficient value;

determine, by the one or more processors of the DSP server executing the machine learning model, an estimate of likelihood of the user interacting with the selected content item within the defined time period based upon the enriched estimation feature vector and the retrieved corresponding coefficient value, wherein the estimate of likelihood of the user interacting with the selected content item comprises a value representing a probability that the user will interact with the selected content item within the defined time period; and determine, based upon the estimate of likelihood of the user interacting with the selected content item within the defined time period, a bid amount for the selected content item for placement within the online content placement slot that will be displayed within the defined time period based on a magnitude of the value with respect to a bid threshold.

* * * * *